(12) United States Patent
Doshita et al.

(10) Patent No.: US 6,811,404 B2
(45) Date of Patent: Nov. 2, 2004

(54) POWER SUPPLY APPARATUS FOR SLIDE DOOR IN MOTOR VEHICLE

(75) Inventors: Kenichi Doshita, Shizuoka (JP); Tohru Aoki, Shizuoka (JP); Hiroshi Watanabe, Shizuoka (JP); Ryoichi Fukumoto, Aichi (JP)

(73) Assignees: Yazaki Corporation, Tokyo (JP); Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/421,852

(22) Filed: Apr. 24, 2003

(65) Prior Publication Data

US 2003/0184119 A1 Oct. 2, 2003

Related U.S. Application Data

(62) Division of application No. 09/829,418, filed on Apr. 10, 2001, now Pat. No. 6,575,760.

(30) Foreign Application Priority Data

Apr. 11, 2000 (JP) .......................... 2000-109474
Mar. 16, 2001 (JP) .......................... 2001-76512

(51) Int. Cl.[7] ............................................ H01R 33/00
(52) U.S. Cl. ................... 439/34; 307/10.1; 174/72 A
(58) Field of Search ..................... 439/34; 307/10.1; 174/72 A

(56) References Cited

U.S. PATENT DOCUMENTS

| 5,466,036 | A | * | 11/1995 | Stroeters et al. | ............ | 296/208 |
| 5,877,936 | A | * | 3/1999 | Nishitani et al. | ............ | 361/600 |
| 5,921,782 | A | * | 7/1999 | Yamaguchi et al. | ........... | 439/34 |

* cited by examiner

Primary Examiner—Gary Paumen
(74) Attorney, Agent, or Firm—Armstrong, Kratz, Quintos, Hanson & Brooks, LLP

(57) ABSTRACT

The additional segment of a wire harness 3 which is required for opening/closing a slide door 1 and constitutes a curved segment 20 is housed in a protector 9. The protector 9 has curved walls 28, 29, guide rail 30, slider 31 and first and second harness outlets 32, 33. When the slide door 1 is opened/closed, the wire harness 3 shuttles to and fro within the second wire harness outlet 33. The looseness of the wire harness when the slide door is opened/closed may be absorbed in such a manner that it is supported by an elastic member in a state where the wire harness has been curved within the protector without using the guide rail 30 and slider 31. The protecting member may be provided with a bending limiting portion, harness securing portion and flange or slanted sliding-contact portion which serve to slide the wire harness smoothly. In this configuration, it is possible to realize improvement of easiness of assembling, saving of the space and smooth operation of a power supply apparatus.

4 Claims, 11 Drawing Sheets

POWER SUPPLY APPARATUS FOR SLIDE DOOR IN MOTOR VEHICLE

This application is a divisional of prior application Ser. No 09/829,418 filed Apr. 10, 2001, now U.S. Pat. No. 6,575,760.

BACKGROUND OF THE INVENTION

1. Field of the Invention

This invention relates to a power supply apparatus for a slide door in a motor vehicle, which is provided with a protector for protecting a wire harness for supplying electric power from a vehicle body to the slide door.

2. Description of the Related Art

Various power supply apparatus for a slide door in a motor vehicle have been proposed. In these power supply apparatus, a door side wire harness which is arranged on the slide door in the motor vehicle is manufactured to have an additional length in view of its movement when the door is opened or closed.

Meanwhile, a conventional power supply apparatus includes a guide rail, a slider, two link arms and a door side wire harness. Specifically, in such a power supply apparatus, the guide rail in a horizontal direction is fixed to the bottom of an inner panel of the slide door. The slider is slidably arranged in a guide hole having a lengthy-hole shape formed in the guide rail. The one end of a first link arm is rotatably coupled with the slider through a shaft portion. The one end of a second link arm is rotatably coupled with the front end of the guide rail though the shaft portion. The other end of the first link arm and the other end of the second link arm are coupled with a rotary shaft. The first link arm and the second link arm are extended upward in an inverted-V shape. A door side wire harness is arranged along these link arms. The door side wire harness expands/contracts by the opening/closing operation of the first link arm and the second link arm attendant on the opening/closing of the slide door. In this case, the overhead of the wire harness extended from the slide door to the vehicle body swings to-and-fro.

However, the power supply apparatus described above has disadvantages that it is complicate in structure, requires a large number of man-hours to assemble the slide door and its assembling operation is troublesome. In addition, it requires a wide space since the guide rail is located over the entire width in a horizontal direction beneath the inner panel, and the first link arm and the second link arm in an inverted-V shape expand/contract. As the case may be, the equipment such as a door pocket and cup holder cannot be provided according to the arrangement of the guide rail. Further, the swinging portion of the wire harness which is extended from the slide door to the vehicle body may interfere with the door trim of the slide door or other portions so that it will be damaged or generate alien sound.

SUMMARY OF THE INVENTION

This invention has been accomplished under the above circumstance.

An object of this invention is to provide a power supply apparatus for a slide door in a motor vehicle which is simple in structure, can improve easiness of assembling, can save a space and is free from the fear that a wire harness interferes with other portions when a slide door is opened/closed so that it is damaged or generates alien sound.

In order to attain the above object, in accordance with this invention, there is provided a power supply apparatus for a slide door in a motor vehicle, comprising:

a wire harness arranged to extend from a vehicle body side to a slide door and having a curved segment at its middle portion in a longitudinal direction;

a protecting member which includes a first harness outlet for supporting the wire harness and a second harness outlet which permits the wire harness to shuttle to and fro in a door opening/closing direction according as the slide door opens/closes and houses the curved segment so that it is movable in parallel to the slide door.

In this configuration, since the above power supply apparatus includes a door-side wire harness and a protecting member in which the curved additional segment of the wire harness which is necessary to open or close the door is housed, the configuration can be simplified. This improves easiness of assembling the power supply apparatus. Further, by controlling the moving range of the curved segment for the inner panel, the space occupied by the power supply apparatus in the slide door can be decreased. Further, since the curved segment of the wire harness is protected from external interference, the wire harness is prevented from being damaged when the curved segment expands/contracts while the wire harness swings in the door opening/closing direction.

Preferably, the protecting member comprises:

a first curved wall and a second curved wall which constitute the first harness outlet between their first ends and the second harness outlet between their second ends, and are curved in the same direction to locate the curved segment therebetween;

a guide portion arranged in the second harness outlet in a state extended in the door opening/closing direction; and a slider which slides along the guide portion while it directly or indirectly holds the wire harness derived from the second harness outlet.

In this configuration, since the protecting member includes the first curved wall, the second curved wall, guide portion and slider, the door side wire harness can be moved smoothly. Further, when the slide door is in the opened or closed state, the curved segment can be pressed on the first curved wall or second curved wall. Thus, in the door closed state, sound or vibration owing to fluttering of the curved segment while the vehicle runs can be reduced. By previously assembling the door side wire harness and protecting member in another manufacturing step, the slide door can be easily assembled.

Preferably, the slider includes a first arm for oscillatably holding the wire harness derived from the second harness outlet in the door opening/closing direction. In this configuration, the door side wire harness can be moved smoothly.

Preferably, the slider includes a second arm for oscillatably holding the curved segment immediately before derived from the second harness outlet in the door opening/closing direction. In this configuration, the door side wire harness can be moved smoothly.

Preferably, the wire harness derived from the second harness outlet having a tube between itself and the slider. In this configuration, since wire harness is directly or indirectly secured to the slider through the tube, it can be protected satisfactorily.

Preferably, the wire harness has an elastic member which is arranged along the curved segment in the vicinity of the first harness outlet and urges the curved segment in a direction leaving from the second harness outlet; and the protecting member has a limiting wall which limits a location of the curved segment urged by the elastic member.

In this configuration, the power supply apparatus can be further simplified, and hence easily assembled.

Preferably, the protecting member has a securing potion for securing the wire harness inside or outside the first harness outlet. In this configuration, any other particular securing means is not required so that the power supply apparatus can be further simplified, and hence easily assembled.

In a preferred embodiment, the power supply apparatus further comprises:

a bending limiting portion arranged inside the protecting member, the bending limiting portion with which an curved inner face of the wire harness and/or the elastic member is brought into contact, and the wire harness is communicated with a corrugated tube on its outer periphery.

In this configuration, where the wire harness is pulled forward within the protecting member when the slide door is fully opened, the wire harness or elastic member is curved along the bending limiting portion, and is not further curved. Therefore, the wire harness or elastic member can be prevented from being bent or damaged. Further, since the elastic member is not damaged, the looseness of the wire harness can be always surely absorbed so that the wire harness is prevented from being caught between the slide door and the vehicle body.

Preferably, the power supply apparatus further comprises a harness securing portion arranged on the upper side of the bending limiting portion.

In this configuration, since the wire harness is curved along the bending limiting portion from the harness securing portion on the upper side of the bending limiting portion, the bending length of the wire harness is shortened so that the stress applied on the wire harness can be reduced, thereby surely preventing plastic deformation or damaging of the wire harness. Even where strong pulling force is exerted on the wire harness when the slide door is opened or closed, since the wire harness is secured by the harness securing portion, pulling-in of the wire harness into the protecting member can be prevented so that looseness of the wire harness does not occur.

Preferably, the harness securing portion has a protrusion to be engaged with a groove of the corrugated tube. In this configuration, the wire harness inclusive of the corrugated tube can be surely fixed immovably in the longitudinal direction, and the corrugated tube can be rotated circumferentially so that the corrugated tube can be fixed comfortably.

Preferably, the protecting member includes a flange formed along second harness outlet, and the flange has a curved face with which the wire harness derived from the second harness outlet is brought into contact. In this configuration, the door side wire harness can be moved smoothly on the way of opening/closing the slide door.

Preferably, the protecting member has a slanted contact portion with which the wire harness derived from the second harness outlet is brought into slanting contact when the slide door is opened, the slanted contact being formed at an inner end of the protecting member in a direction of opening the slide door. In this configuration, when the slide door is fully opened, the wire harness is brought into strong contact with the end of the protecting member in the direction of opening the slide door. In this case, since the wire harness is brought into contact with the slanted contact portion not at a right angle but a slanting angle in the longitudinal direction so that shock is relaxed, thereby avoiding occurrence of alien sound.

Preferably, the protecting member has slanted sliding-contact portions by which the wire harness derived from the second harness outlet is guided with no catching when the slide door is opened or closed, the slanted sliding contact portions being formed at both ends of the protecting member in the door opening/closing direction. In this configuration, when the slide door has been fully opened, the wire harness is derived externally from the one end of the protecting member. When the slide door is closed from this state, the wire harness is smoothly guided inside with no catching along the slanted sliding-contact portion. This avoids great abrading sound and damaging of the wire harness, and also prevents the force of closing the slide door from increasing, thus improving the operability of closing. On the other hand, when the slide door has been fully closed, the wire harness is derived externally from the other end of the protecting member. When the slide door is opened from this state, the wire harness is smoothly guided inside with no catching along the slanted sliding-contact portion. Likewise, this avoids great abrading sound and damaging of the wire harness, and also prevent the force of opening the slide door from increasing, thus improving the operability of opening.

Preferably, the protecting member is composed of a protector body and a protector cover which is engaged with the protector body in a state where the curved segment of the wire harness is housed. In this configuration, since the protecting member is composed of the protector body and protector cover, easiness of assembling the protecting member can be improved.

Preferably, the protector body has a securing component which is engaged with the slide door or the vehicle body. In this configuration, since the protector body can be provisionally secured to the slide door in such a manner that the securing component is fit in the slide door, the subsequent assembling can be facilitated.

The above and other objects and features of the invention will be more apparent from the following description taken in conjunction with the accompanying drawings.

DESCRIPTION OF THE PREFERRED EMBODIMENTS

Embodiment 1

Figure 1:
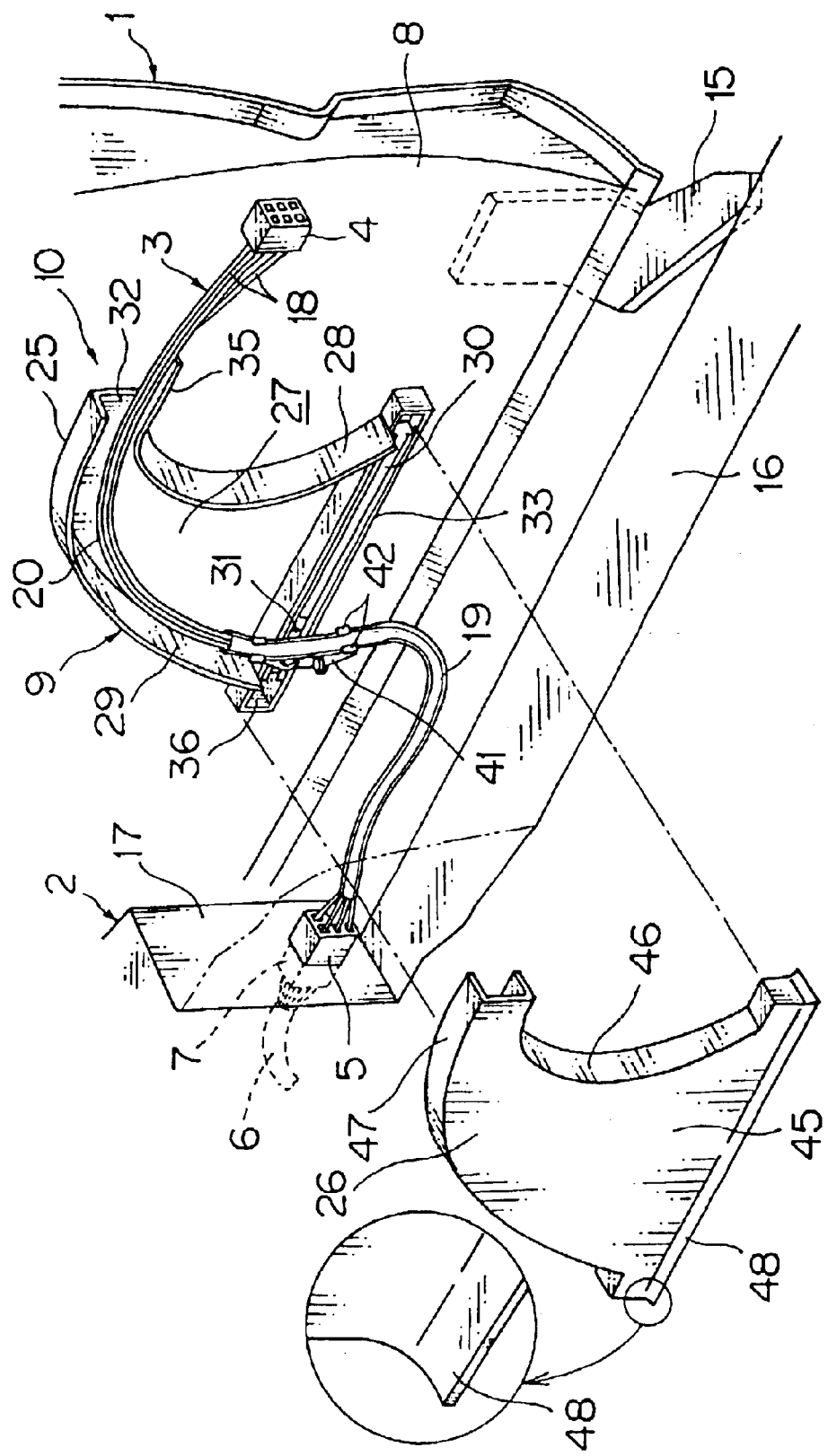
FIG. 1 is an exploded perspective view of a first embodiment of a power supply apparatus for a slide door in a motor vehicle according to this invention.
Figure 2:
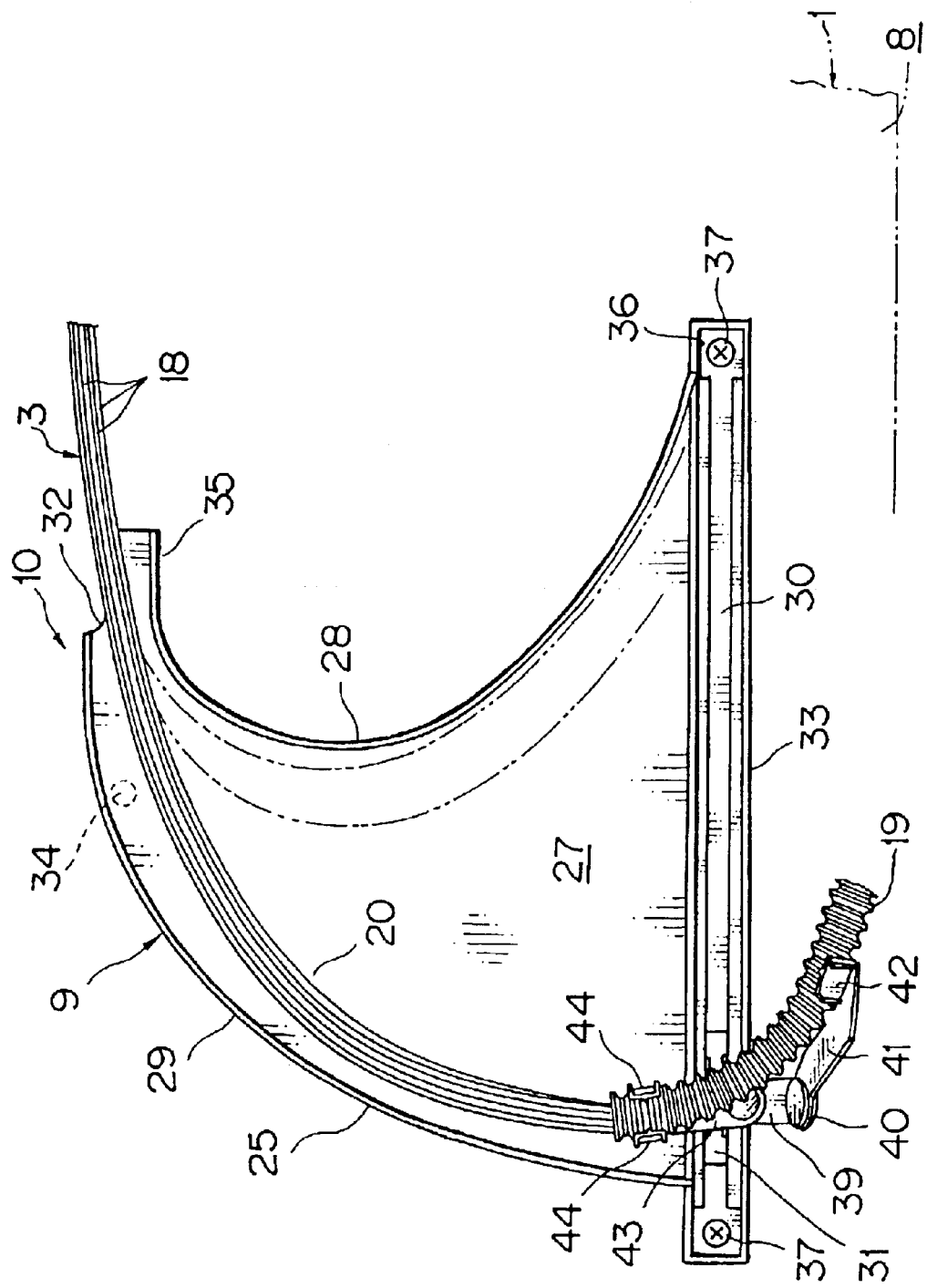
FIG. 2 is a front view of a protector (exclusive of a cover) which is a member for protecting a curved segment.
Figure 3:
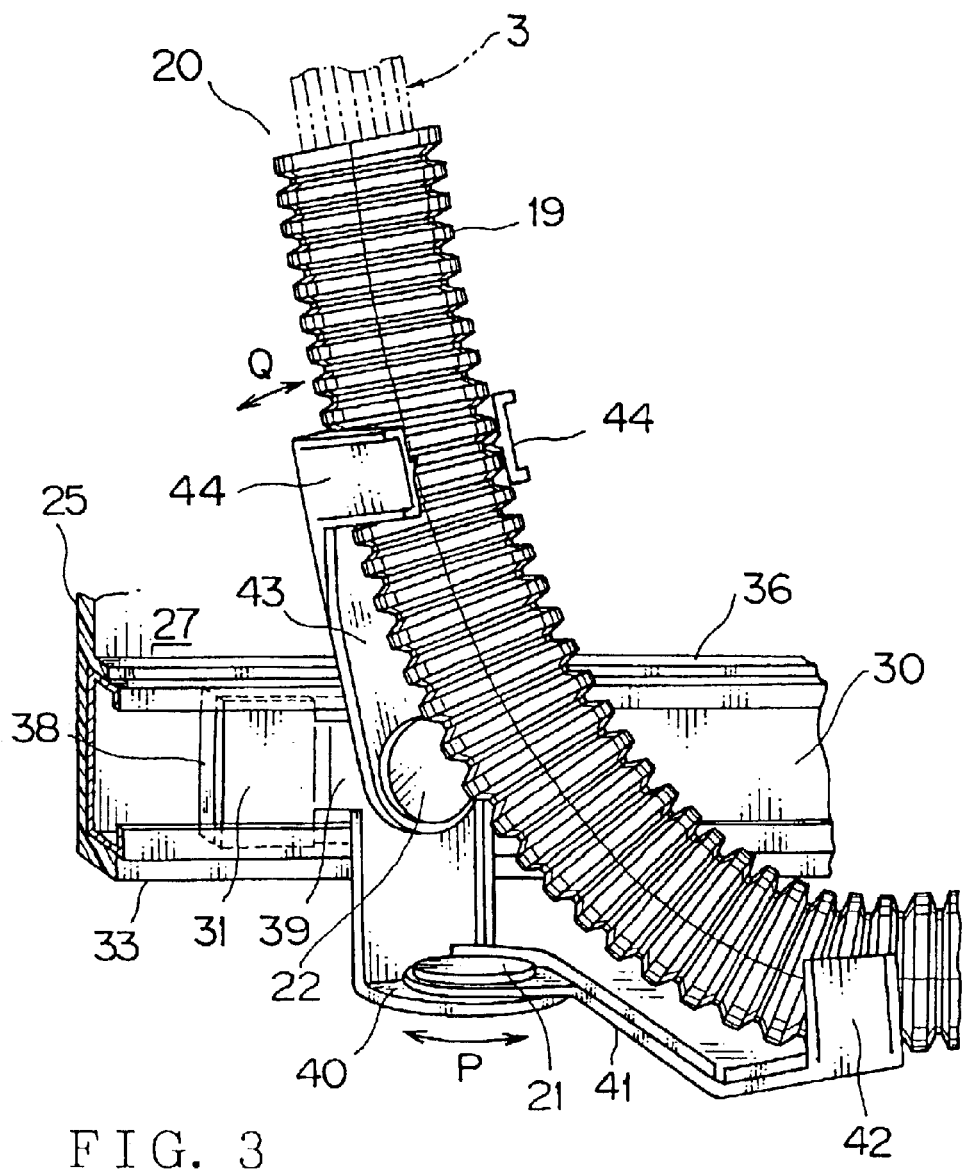
FIG. 3 is an enlarged perspective view of the slider shown in FIG. 1.

FIG. 1 is an exploded perspective view of a first embodiment of a power supply apparatus for a slide door in a motor vehicle according to this invention. FIG. 2 is a front view of a protector (exclusive of a cover) which is a member for protecting a curved segment. FIG. 3 is an enlarged perspective view of the slider shown in FIG. 1.

As seen from FIG. 1, in a slide door 1 of a motor vehicle such as one-box car or some passenger cars, a door-side wire harness 3 is arranged to supply power from a vehicle body 2 to various kinds of subsidiary machines such as a power window motor, door lock unit and a speaker which are arranged within the slide door. The door-side wire harness 3 is arranged over the slide door 1 and the vehicle body 2. The one end thereof is connected to the above various subsidiary machines through a connector (only one is shown). The other end thereof is connected to a connector 7 of a vehicle-body side wire harness through a connector 5. In the slide door 1, the door side wire harness 3 is arranged together with a protector 9 (which corresponds to protecting member in claims) which is attached to an inner panel 8 of the slide door 1. The protector 9 constitutes a power supply apparatus 10 in this embodiment. Use of the door side wire harness 3 and protector 9 simplifies the structure of the power supply apparatus 10, and further saves the space and improves easiness of assembling.

First, a detailed explanation will be given of each of the above components and the operation when the slide door is opened or closed.

The slide door 1 is slidably attached to the vehicle body 2. The sliding direction thereof is a to-and-fro direction of the vehicle body 2 (It should be noted that the slide door 1, when opened, is pulled out externally from the vehicle body 2, and when closed, it is returned to an original position). The slide door 1 has an inner panel 8 on the side of the vehicle body 2. A hinge roller 15 is attached to the lower end of the slide door 1. The hinge roller 15 is slidably engaged with the a rail (not shown) attached to the bottom of the vehicle body 2.

The vehicle body 2 is provided with a step 16 at a position where the slide door 1 is closed. Inside a vertical wall 17 of the step 16, the connector 7 of the vehicle body side wire harness 6 is arranged. Namely, the connector 5 of the door-side wire harness 3 and the connector 7 of the vehicle-body-side wire harness 6 are connector-connected to each other inside the vertical wall 17. Incidentally, the vehicle-body-side wire harness is connected to a battery (not shown) directly or indirectly.

The door-side wire harness 3 is a bundle of a plurality of electric wires 18. The door-side wire harness 3 is equipped with the connector 4 at one end and with the connector 5 at the other end. On the side of the connector 5, a corrugated tube 19 (which corresponds to a tube member in claims). Any tube may be used as long as it can be bent) is fit over the wire harness 3. The corrugated tube 19 serves to protect the door-side wire harness extended from the protector 9 toward the vehicle body 2. The corrugated tube 19 is provided optionally. As the case may be, the plurality of electric wires 18 are wound by a tape.

The door-side wire harness 3 has a curved segment 20 at its middle portion. The curved segment 20 is housed in the protector 9. The curved segment 20 is arranged movably in substantially in parallel to the inner panel 8.

The protector 9 includes a protector body 25 secured to the inner panel 8 and a cover 26 engaged therewith. In view of the moving range of the curved segment 20, the protector 9 is formed so that its size is minimized. The protector body 25 and cover 26 are made of synthetic resin (They can be formed by stamping out a thin metallic plate).

The protector body 25, as shown in FIG. 1 or 2, includes a first curved wall 28 and a second curved wall 29 which are vertically extended from the edge of a base plate 27, a guide rail (which corresponds to a guiding portion in claims) 30, and a slider 31 which is slidably engaged with the guide rail 30. At the one end (upper end) of each of the first curved wall 28 and second curved wall 29, a first harness outlet 32 is formed, whereas at the other end (lower end) thereof, a second harness outlet 33 is formed.

The base plate 27 is formed along the attaching face of the inner panel 8. A securing piece 34 is formed to protrude from the face opposite to the inner panel 8 of the base plate 27. The securing piece 34 is equipped with a pair of lugs on both sides of a slit. The securing piece 34 is a "clip". When the protector body 25 is attached to the inner panel 8, the pair of lugs are elastically deformed in a direction approaching each other so that they are fit into the hole of the inner panel 8. The protector body 25 is provisionally engaged with the inner panel 8 by the securing piece 34 so that the subsequent operation will be smoothly carried out.

The first curved wall 28 is formed orthogonally to the base plate portion 27. It is formed in a C-shape viewed from the front. It is curved so that its both ends are oriented to the front side of the vehicle body 2. The first curved wall 28 has a tongue piece which protrudes outwardly form the first harness outlet 32. The door-side wire harness 3 taken out may be wound by a tape. The tongue piece 35 may correspond to a fixed portion).

The second curved wall 29 is also formed orthogonally to the base plate portion 27. It is curved to have a larger curvature of radius than that of the first curved wall 28. It is curved in the same direction as the first curved wall 28.

The first harness outlet 32 is formed to have a size enough to take out the door-side wire harness 3. The second harness outlet 33 is opened wider than the first harness outlet 32 so that the reciprocating movement of the door-side wire harness 3 due to the movement of the slider 31 is permitted. The second harness outlet 33 is opened downward from the slide door 1.

The guide rail 30 is fit in a frame-shaped housing 36 which is formed integrally to the second harness outlet 33. The guide rail 30 is formed in a ⊐-shape in section and secured at its both ends to the slide door 1 by bolts 37, 37 (For example, it is secured together with the housing portions 36 after the protector body 25 has been secured provisionally). The guide rail 30 is arranged to extend in a direction of opening/closing of the slide door 1 (or the above to-and-fro direction).

The slider 31, as shown in FIG. 3, includes a square block body 38 which moves slidably on the guide rail 30 and an arm supporting stem portion 39 which is integral to the block body 38 to slide on the guide rail 30 and protrudes from the opening of the guide rail 30. The block body 38 is formed in square. The central protruding potion of the arm supporting stem 39 integrally includes a vertical portion extending downward from the slide door 1 and a tongue-shaped protrusion 40 for supporting an arm, which bends horizontally from the lower end of the vertical portion. The block body 38 is made of synthetic resin in order to improve smoothness. Incidentally, the supporting stem 39 which enters the guide rail 30 is preferably formed in a sandwiching structure of the same material as the block body 38 by insert molding.

The one end of the first arm member 41 is rotatably attached to the protrusion 40 for arm supporting through a shaft portion 21 such as a rivet. The other end thereof is integrally communicated with the a pair of securing pieces 42, 42 for securing the corrugated tube 19. The securing pieces 42, 42 each has protrusions (not shown) to be fit in the circumferential grooves of the corrugated tube 19. The corrugated tune 19 can be supported rotatably in the circumferential along the protrusions (not shown) so that the wire harness 3 can be smoothly swung according to the rotation of the arm 41. The door-side wire harness 3 which is extended from the second harness outlet 33 is secured to the corrugated tube 19 and the first arm member 41. Thus, the length of the curved segment 20 is unvaried within the protector 9. Because of the presence of the first arm member 41, the door-side wire harness 3 extended from the second harness outlet 33 is oscillatable (direction of arrow P) in the direction of opening/closing the slide door 1 (the above to-and-fro direction).

On the other hand, the supporting stem 39 has a second arm member 43 which extends into the protector 9 and serves to oscillatably (direction of arrow Q) secure the door-side wire harness 3, immediately before extended along the base plate 27, in the direction of opening/closing the slide door 1 (or the above to-and-fro direction). The one end of the second arm member 43 is rotatably secured to the supporting stem 39 by the shaft portion 22 such as a rivet. The other end thereof is integrally communicated with the a pair of securing pieces 44, 44 for securing the corrugated tube 19. The securing pieces 44, 44 each has protrusions (not shown) to be fit in the circumferential grooves of the corrugated tube 19. The corrugated tune 19 can be supported rotatably in the circumferential along the protrusions (not shown) so that the wire harness 3 can be smoothly swung according to the rotation of the arm 43.

Returning to FIG. 1, the cover 26 includes a cover-side base plate 45 which is opposite to the base plate 27, a first side wall 46 which extends along the first curved wall 28 and a part of the housing portion 36, and a second side wall 47 which extends along the second curved wall 29 and a part of the housing portion 36. The one end of each of the first side wall 46 and second side wall 47 serves to make the first harness outlet 32 (FIG. 2), whereas the other end thereof serves to make the second harness outlet 33 (FIG. 2). A flange 48 is formed to protrude outwardly at the edge of the above other end. The flange 48 has a curved face (not shown) with which the door-side wire harness 3 derived from the harness outlet 33 is brought, through the corrugated tube 19, into contact. Since the curved flange 48 is not contact with the door-side wire harness 3 at its edge, the movement of the derived door-side wire harness 3 (inclusive of the corrugated tube 19) can be made, and the endurance of the door-side wire harness 3 (inclusive of the corrugated tube 19) can be improved.

Incidentally, it should be noted that the cover 26 is engaged with the protector body 25 using an suitable means from the side of the vehicle body 2. For example, the cover 26 is equipped with a flexible securing piece (not shown) and the protector body 25 is equipped with an engagement piece (not shown) corresponding to the securing piece.

An explanation will be given of the operation when the slide door 1 is opened or closed.

FIGS. 1 and 2 show the manner where the slide door 1 is slid rearward from the closed state to the open state. When the slide door 1 is shifted from the closed state to the opened state, first, the slider 31 is located in the vicinity of the rear end of the guide rail 30 (with respect to the vehicle body 2) and the curved segment 20 is located in the state where it has been pulled to the side of the second curved wall 29 (maybe in contact with the second curved wall 29). The other end of the first arm member 41 oscillates toward the front of the guide rail 30.

When the slide door 1 is slid rearward to open, the slider 31 moves along the guide rail 30 so that it is located at the vicinity of the front end of the guide rail 30 (with respect to the vehicle body 2). The curved segment 20 moves in parallel to the inner panel 8, and is pressed against the first curved wall 28 (seen phantom lines in FIG. 2). When the slide door 1 is closed, the other end of the first arm member 41 oscillates toward the rear end of the guide rail 30. Thus, in the state where the slide door 1 is open, the curved segment 20 is situated at the first curved wall 28, whereas in the state where the slide door 1 is closed, the curved segment 20 is pressed against the second curved wall 29. Therefore, while the curved segment 20 moves, it does not thrash and hence does not generate sound nor vibration.

Embodiment 2

Figure 4:
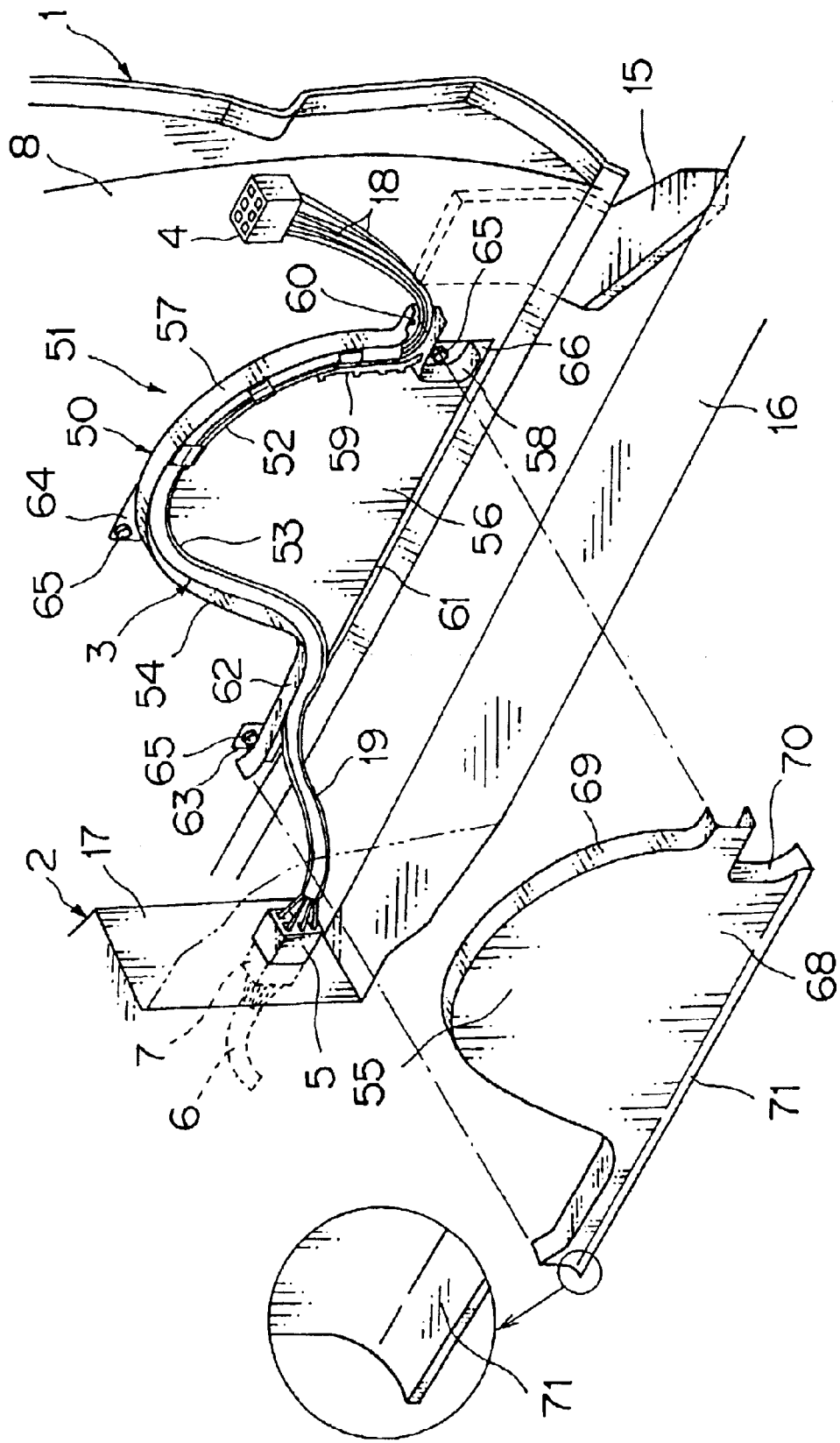
FIG. 4 is an exploded perspective view of a second embodiment (in a closed state of the slide door) of a power supply apparatus for a slide door in a motor vehicle according to this invention.
Figure 5:
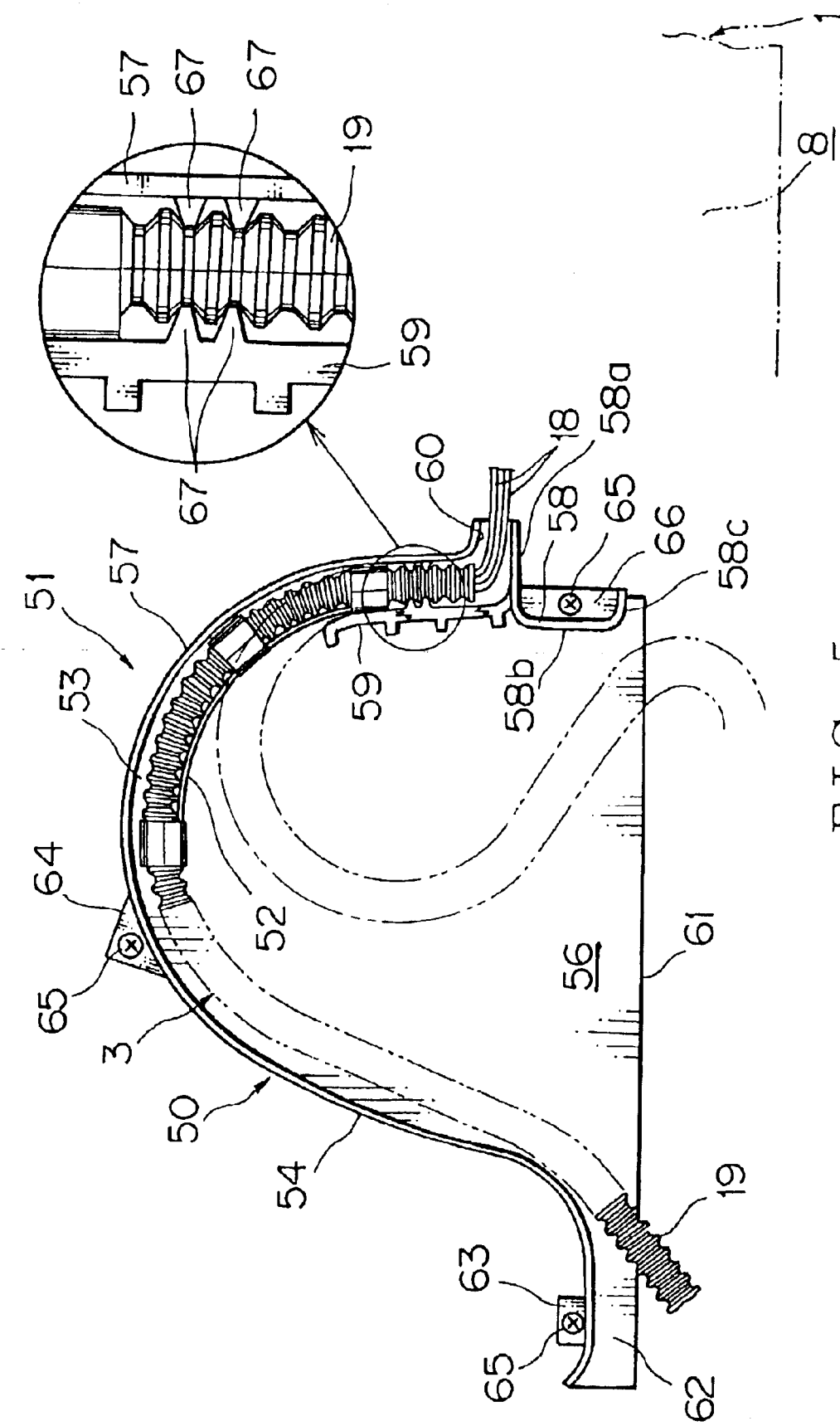
FIG. 5 is a front view of a protector (exclusive of a cover) which is a member for protecting a curved segment shown in FIG. 4.
Figure 6:
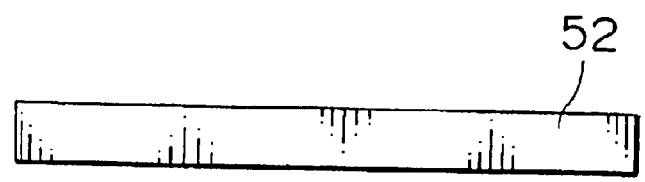
FIG. 6 is a plan view of an elastic member shown in FIG. 4.
Figure 7:
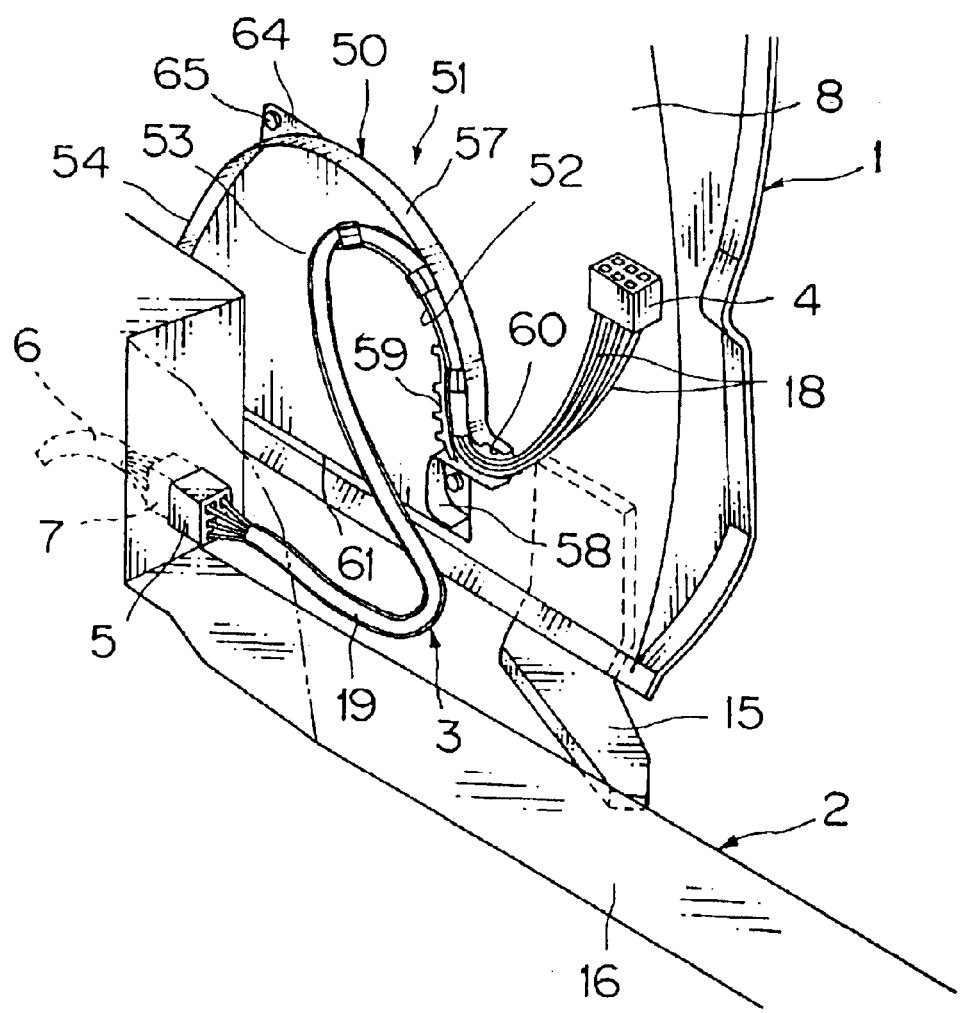
FIG. 7 is an exploded perspective view of a power supply apparatus when the slide door shown in FIG. 4 is open.

FIG. 4 is an exploded perspective view of a second embodiment (in a closed state of the slide door) of a power supply apparatus for a slide door in a motor vehicle according to this invention; FIG. 5 is a front view of a protector (exclusive of a cover) shown in FIG. 4; FIG. 6 is a plan view of an elastic member shown in FIG. 4; and FIG. 7 is an exploded perspective view of a power supply apparatus when the slide door shown in FIG. 4 is open.

In these figures, like reference numerals refer to like elements in FIGS. 1 to 3.

As seen from FIG. 4, like FIG. 1, in a slide door 1, a door-side wire harness 3 is arranged. The door-side wire harness 3 is arranged over the slide door 1 and the vehicle body 2. The one end thereof is connected to the above various subsidiary machines through a connector (only one is shown). The other end thereof is connected to a connector 7 of a vehicle-body side wire harness through a connector 5. In the slide door 1, the door side wire harness 3 is arranged together with a protector 50 (corresponds a protecting member in claims) which is attached to an inner panel 8 of the slide door 1. The protector 9 constitutes a power supply apparatus 51 in this embodiment. Use of the door side wire harness 3 and protector 50 simplifies the structure of the power supply apparatus 51, and further saves the space and improves easiness of assembling.

First, a detailed explanation will be given of each of the above components, and the operation when the slide door is opened or closed.

The slide door 1 is provided with an inner panel 8 on the side of the vehicle body 2 and a hinge roller 15 on the lower end. The vehicle body 2 is provided with a step 16 at a position where the slide door 1 is closed. Inside a vertical wall 17 of the step 16, the connector 7 of the vehicle body side wire harness 6 is arranged.

The door-side wire harness 3 is a bundle of a plurality of electric wires 18 which is fit in a corrugated tube 19. The corrugated tube 19 includes an elastic member 52 (which is fixed by a ring-shaped fixing member or tape). The elastic member 52 is a strip-like resilient thin plate (made of metal or synthetic resin, see FIG. 6) and serves to urge a curved segment 53 (described later) upward. The elastic member 52 is arranged along the curved segment 53 in the vicinity of a first harness outlet 60 (described later). Incidentally, the one end of the elastic member 52 is extended the intermediate position of the curved segment 53.

The door-side wire harness 3 has the curved segment 53 at its middle point in a state where it is fit in the corrugated tube 19. The curved segment 53 is housed in the protector 50. The curved segment 53 is arranged movably in parallel to the inner panel 8. The provision of the curved segment 53 provides urging force to the elastic member 52. The location of the curved segment 53 urged by the elastic member 52 is regulated by a regulating wall 57.

The protector 50 includes a protector body 54 which is attached to the inner panel 8 and a cover 55 which is engaged with the protector body 54. In view of the moving range of the curved segment 53, the protector 50 is formed so that its size is minimized. The protector body 54 and cover 55 are made of synthetic resin (They can be formed by stamping out a thin metallic plate).

The protector 54, as shown in FIGS. 4 and 5, includes a semi-circular base plate 56 in contact with the inner panel 8, a curved limiting wall 57 which extends vertically from the edge of the base plate 56, a ⊐-shaped stem wall 58 which is opposite to the one end of the limiting wall 57 and a fixed wall 59 for harness fixing which extends along and is opposite to the limiting wall 57. As seen from FIG. 5, the stem wall 58 consists of a horizontal upper wall 58a, a vertical side wall 58b and a horizontal lower wall 58c. A first harness outlet 60 is formed between the one end (front end) of the limiting wall 57 and the upper wall 58 of the stem wall 58. A second harness outlet 61 which is lengthy horizontally is formed between the other end (rear end) of the regulating wall 57 and the side wall 58b or lower wall 58c of the stem wall 58.

The limiting wall 57 is formed to limit the position of the curved wall 53 of the wire harness 3 urged by the elastic member 52. In this embodiment, the limiting wall 57 is formed in an arc oriented upward. On the side of second harness outlet 61, the limiting wall 57 is communicated with an extending portion 62 which extends straight rearward. Flanges 63 and 64 for attachment to the inner panel 8 are formed at the edges of the limiting wall 57 and the extending portion 62. The protector body 54 is fastened to the inner panel 8 by bolts 65, 65 through the flanges 63 and 64 for attachment. Incidentally, the flange 64 for attachment may be provided with the securing piece 34 (FIG. 2).

The stem wall 58 constitutes the first harness inlet 60 and the second harness inlet 61. Like the flanges 63 and 64 for attachment, an attachment flange 66 formed on the stem 58 is bolted by a bolt 65.

The fixed wall 59 is arranged in parallel to the limiting wall 57 in the vicinity of the first harness outlet 60 so that the corrugated tube 19 can be inserted in between the fixed wall 59 and the limiting wall 57, and secured there. Specifically, the fixed wall 59 has two securing protrusions 67, 67 (which corresponds to the securing portion) to be fit in the grooves of the corrugated tube 19. The limiting wall 57 opposite to the fixed wall 59 has also two securing pieces 57 (It should be noted that the number of the securing pieces 57 is optional).

As seen from FIG. 4, the cover 55 includes a cover-side base plate 68 which is opposite to the base plate 56, an arc-shaped peripheral wall 69 which extends along the limiting wall 57 and a short side wall 70 which extends along the stem wall 58. The one end sides of the peripheral wall 69 and the side wall 70 constitute the first harness outlet 60 (FIG. 5) whereas the other end sides thereof constitutes the second harness outlet 61 (FIG. 5). On the side of the other ends, the cover 55 is provided with a curved flange 71 which protrudes outwardly. The flange 71 has a surface (not shown) with which the door-side wire harness 3 derived from the second harness outlet 61 is brought into contact through the corrugated tube 19. When the slide door 1 is opened or closed, the curved flange 71 is not brought in contact with the door-side wire harness 3 at its edge. Therefore, the curved flange 71 implements smooth movement of the derived door-side wire harness 3 (inclusive of the corrugated tube 19) and prevents the door-side wire harness from being injured, thereby improving its endurance. Further, the door-side wire harness 3 curved downward along the curved flange 71 is derived toward the vehicle body 2 so that it does not interfere with the lower end of the door trim (not shown) of the slide door 1. This prevents the door-side wire harness 3 from rubbing the lower end of the door trim.

It is assumed that the cover 55 is engaged with the protector body 54 through a suitable means. For example, a securing piece (not shown) is formed on the outer periphery of the protector body 54 and an engaging piece (not shown) to be engaged with the securing piece is formed on the peripheral wall 69 of the cover 55.

An explanation will be given of the operation of the slide door 1 when it is opened/closed.

In FIGS. 4 and 5, when the slide door 1 is in a closed state, the curved segment 53, which is being urged by the elastic member 52 is arranged, is arranged along the limiting wall 57 (the curved segment 53 does not thrash and hence does not generate sound nor vibration). The door-side harness 3 (inclusive of the corrugated tube 19) is derived from the second harness outlet 61 at the extending portion 62.

In this state, the slide door 1 is operated. When the slide door 1 falls into the opened state, the curved segment 53 of the door-side wire harness 3 contracts against the urging force by the elastic member 52 on the way of movement (phantom line in FIG. 5). Therefore, the door-side wire harness 3 (inclusive of the corrugated tube 19) moved to the vehicle body 2 is derived through the second harness outlet 61 on the side of the stem wall 58. Incidentally, because of the urging force by the elastic member 52, the door wire harness 3 (inclusive of the corrugated tube 19) does not dangle downward from the vehicle body 2.

As understood from the description with reference to FIGS. 1 to 7, there is provided a power supply apparatus 10 (51) for an in-vehicle slide door which comprises the door-side wire harness 3 and the protector 9 (50), wherein the additional length of the door-side wire harness 3 required for opening/closing of the slide door 1 is housed in the protector 9 (50). In this configuration, the structure of the power supply apparatus is simplified to improve the efficiency of assembling. The space occupied by the power supply apparatus 10 (51) can be determined in view of the movement range of the curved segment 20 (53) for the inner panel 8 so that the space can be saved.

It is needless to say that various changes or modifications can be made without departing the spirit of this invention. Incidentally, as a modification, the protector body (protecting member body) can be integrated to the inner panel.

FIGS. 8 to 12 show a power supply apparatus 51' in which an improvement is made for the embodiment of FIGS. 4 and 5 so that the swing of the wire harness 3 attendant on the opening/closing of the slide door 1 can be done more smoothly and with no alien sound. In these figures, like reference numerals refer to like elements in FIGS. 4 and 5.

The power supply apparatus 51' is characterized in that a slanted contact portion 72 and slanted sliding-contact portions 73 to 75 with which the door-side harness can be brought into contact or sliding contact, are formed at both front and rear ends of the protector 50 of synthetic resin.

Figure 10:
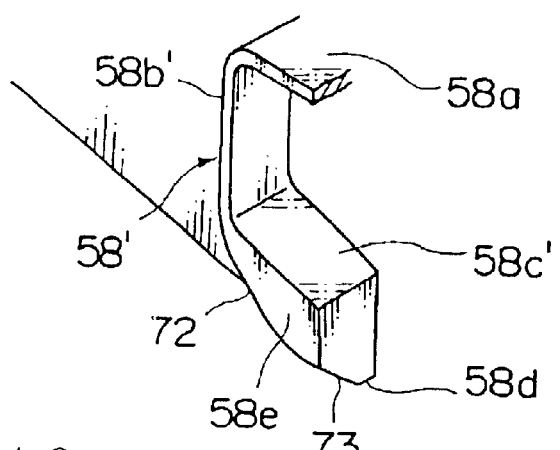
FIG. 10 is an enlarged view at a part A in FIG. 8.
Figure 8:
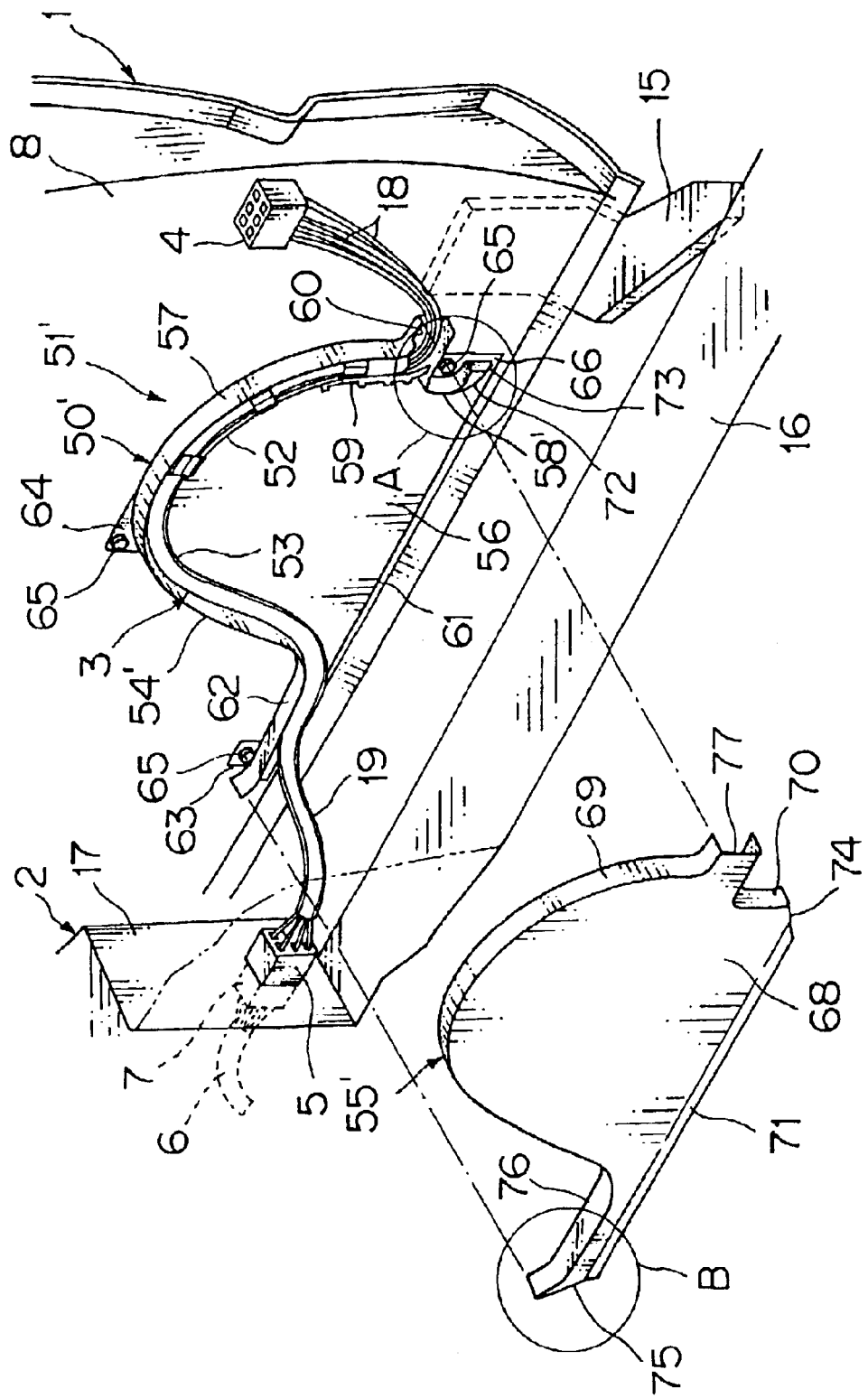
FIG. 8 is an exploded perspective view of a modification of the second embodiment (in a closed state of the slide door) of a power supply apparatus for a slide door in a motor vehicle according to this invention.
Figure 9:
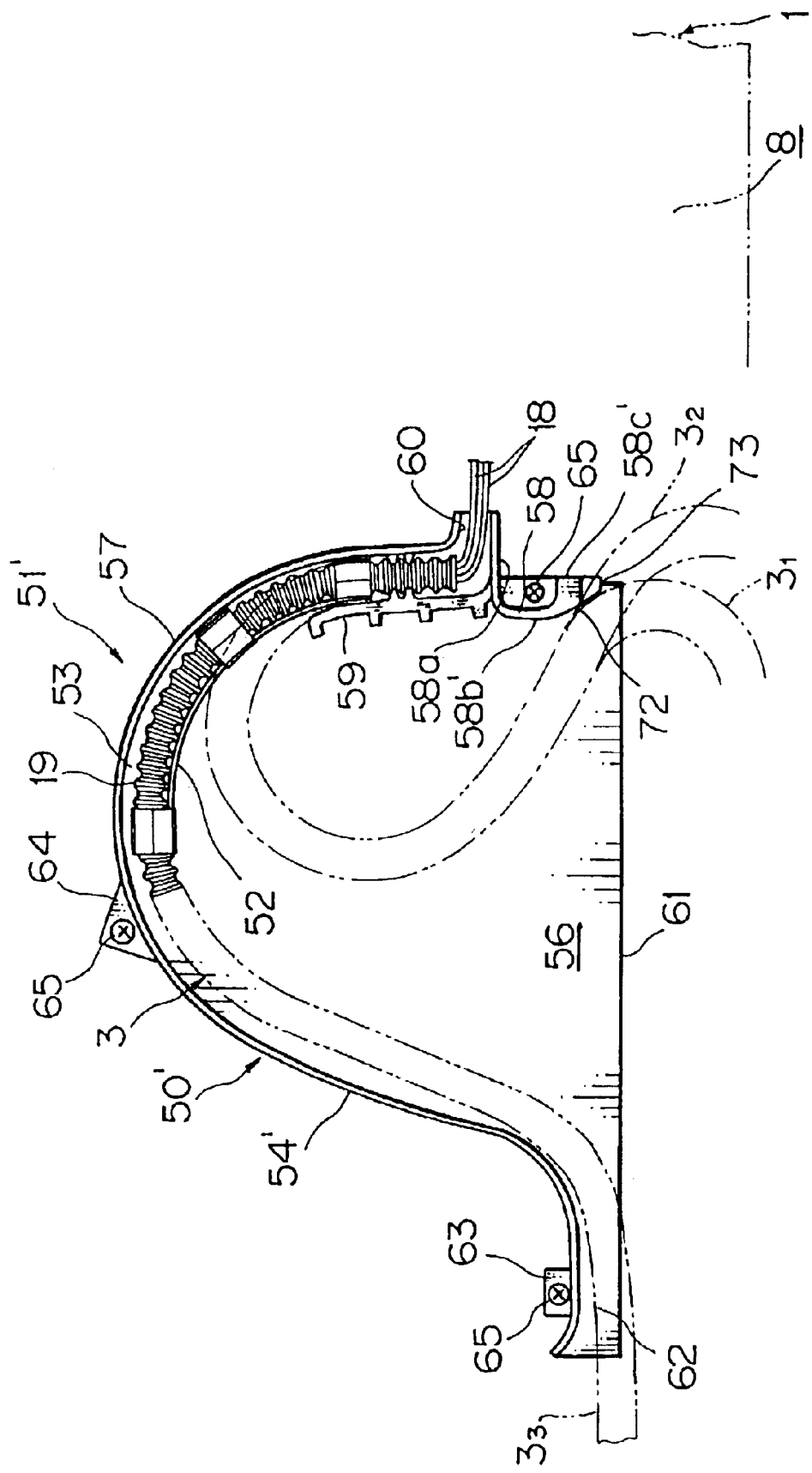
FIG. 9 is a front view of a protector (exclusive of a cover) which is a member for protecting a curved segment shown in FIG. 8.

Specifically, as shown in FIGS. 8 to 10, the slanted contact portion 72 is formed to extend from a side wall 58b' of the inverted- ⊐ stem wall 58' on the lower side of the first harness outlet 60 to a block-shaped lower wall 58c'.

The slanted contact portion 72 has a tapered face in the same direction as that of the lower end of the tube securing wall 59. The tapered contact face 72 is located inside the protector 54'. The lower wall 58c' of the stem wall 58' is formed to have an increased volume in a block shape. The side wall 58b' of the stem wall 58' is shorter than that of the side wall 58b. The block-shape lower wall 58c' may not be solid but hollow. In this case also, the slanted contact face 72 and slanted sliding face 73 are provided.

In operation, as seen from FIG. 9, when the slide door 1 is fully opened, the wire harness 3 is pulled forward to slant with a small curve like a chain line $3_1$. At this time, the wire harness 3 is brought aslant into contact with the stem wall 58 along the slanted contact face 72 so that shock force is relaxed, thereby preventing occurrence of alien sound. For example, when the wire harness 3 is brought into contact with the side wall 58b of the stem wall 58 (FIG. 5) with no slanted contact face in the state of chain line $3_1$, the wire harness 3 is brought into contact with the side wall 58b in a direction perpendicular to the longitudinal direction of the wire harness. This may generate alien sound. The slanted contact face 72 removes the fear of occurrence of the alien sound. Specifically, the wire harness 3 is brought aslant into face-contact with the slanted contact face 72 like chain line $3_1$ so that the shock force for the wire harness 3 is decreased, thereby preventing the deformation or damage as well as occurrence of the alien sound. The wire harness 3 indicated by chain line $3_1$ is derived from the second harness outlet 61 on the lower side.

The first harness outlet 60 is constituted by the upper wall 58a of the lengthy upper wall 58a of the stem wall 58' and the curved protruding portion of the limiting wall 57 on the upper side. As indicated by chain line $3_3$ in FIG. 9, when the slide door 1 is fully closed, the wire harness 3 is pulled rearward and located along the rear extending portion 62 of the protector body 54'. Then, the wire harness 33 is derived from the second harness outlet 61 on the lower side toward the vehicle body 2. The wire harness 3 is secured at a prescribed position on the side of the vehicle body, i.e. vertical wall 17 at the rear end of the step 16 (FIG. 8).

As shown in FIGS. 9 and 10, on the side of lower end of the lower wall 58c' of the stem wall 58', a slanted sliding-contact portion (or face) 73 facing the vehicle body. The slanted sliding-contact plane 73 is successive to cross the above slanted contact face 72, and slanted from the horizontal lower end face 58d (FIG. 10) of the lower wall 58c' to the vertical side wall 58e near to the vehicle body.

Where the slide door 1 has been fully opened as indicated by chain line $3_2$, for example, when the wire harness 3 is pulled forward to protrude more forward than the protector body 54', the slanted sliding-contact face 73 permits the wire harness $3_2$ to be derived smoothly forward with no catching. In addition, in the operation of closing the slide door 1, when the wire harness 3 is returned from the state of chain line $3_2$ to the state of chain line $3_1$, this slanted sliding-contact face 73 serves to move the wire harness $3_2$ smoothly rearward with no catching. Since the wire harness $3_2$ moves or swings with no catching, the alien sound is not generated and the wire harness $3_2$ is not abraded not damaged. Even when the wire harness 3 does not include the corrugated tube 19 or other protection tube, the above effect can be obtained.

As seen from FIG. 8, the protector body 54' includes a semi-circular vertical base plate 56, a limiting wall 57 around the base plate 56, the above stem wall 58' and a rear extending portion 62. Further, the protector body 54' has the first harness outlet 60 at its front and a second harness outlet 61 which is wide on the lower side. The protector body 54' is secured to the inner panel 8 by a bolt 65 or other securing means. The front portion of the wire harness 3 is derived from the first harness outlet 60, and the electric wires 18 at the front are connected to the electric appliance (not shown) through the connector 4. The rear portion of the wire harness 3 is derived from the second harness outlet 61 on the lower side, and connected to the wire harness 6 on the side of the vehicle body. In FIG. 8, reference numeral 64 denotes an attaching flange and reference numeral 15 denotes a hinge roller.

Referring to FIG. 8, a cover 55' is put on the protector 54', and the cover 55' is one-touch secured to the protector 54' by a securing means (not shown). The cover 55' includes a cover-side base plate 68 which is vertical, a peripheral wall 69, a side wall 70 on the front lower side, a rear extending portion 76, an inverted- ⊐ (in vertical cross-section) shape portion 77 which constitutes the first harness outlet 60 between the peripheral wall 69 and the side wall 70 and protrudes forward, and a curved flange 71 on the lower end side of the base plate 68. The cover 55' has a slanted sliding-contact portions 74 and 75 for guiding the wire harness formed on the front lower portion and the rear lower portion.

The front slanted sliding-contact portion 74 is formed so that the base plate 68 and flange 71 are cut in a taper-shape oblique-downward and rearward from the lower end of the side wall 70. The slanted sliding-contact portion 74 is preferably is formed linearly or in a curved shape so as to communicate with the base plate 68 and the flange 71. Where the flange 71 is greatly curved to serve as a portion of the base plate 68, the slanted sliding-contact portion 74 may be formed at the flange 71.

Thus, the wire harness $3_2$ which protrudes forward from the inside of the side wall 70 of the cover 55' as indicated by chain line $3_2$ in FIG. 9 can be moved smoothly with no catching and rearward along the slanted sliding-contact portion 74. This prevents the operating force when the slide door 1 is closed from increasing, thereby improving the operability and suppressing abrading sound. This is because the increase in the operating force and grazing sound are attributable to the catching of the wire harness $3_2$.

The slanted sliding-contact portion 74 is located substantially oppositely to the slanted sliding-contact 72 of the protector body 54'. Therefore, the combined effect by both slanted sliding-contact portions 72 and 74 surely prevents the wire harness 3 from being damaged and the operability of the slide door 1 from being deteriorated.

The side wall 70 at the front of the cover 55' is located along the front side of the stem wall 58' of the protector body 54', and at least the side wall 58b' of the stem wall 58' and the slanted contact portion 72 or its upper half are accommodated inside the side wall 70.

As shown in FIG. 8, the rear slanted sliding-contact portion 75 is formed at the rear end of the rear extending portion 76. As seen from the enlarged view of FIG. 11, the slanted sliding-contact portion 75 is formed so that the base plate 68 and curved flange 71 are cut in a taper-shape oblique-downward and forward from the upper wall 78 of the rear extending portion 76. The flange 71 is also preferably cut integrally to the base plate. Where the rear slanted sliding-contact portion is curved, the center of the curve is located at the forward top of the rear extending portion 76 to provide a shape curved outwardly from the rear end 78a of the upper wall 78. The slanted sliding-contact portion 75 is communicated with the curved flange 71. The second harness outlet 61 (FIG. 8) is located inside the flange 71.

The rear end of the rear extending portion 76 is opened so that as indicated by chain line $3_3$ in FIG. 9, the wire harness 3 is derived rearward from the extending portion 76. The rear end of the upper wall 78 of the extending portion 76 is curved upward. This permits the wire harness $3_3$ to be bent smoothly upward along the curved portion 78b from the extending portion 76.

As indicated by chain line $3_3$ in FIG. 9, in the operation of opening the slide door 1, the wire harness 3 derived rearward from the rear extending portion 62 when the slide door 1 has been closed is guided smoothly along the rear slanted sliding-contact portion 75 of the cover 55' with no catching from above oblique-downward so that it moves along the curved flange 71 while it is in sliding contact with the flange 71. Thus, since the wire harness 33 can move forward with no catching, an increase in the force required to open the slide door 1 can be prevented to implement the smooth opening operation. In addition, it is possible to suppress damage/deformation of the wire harness 3 and generation of alien sound due to its catching.

Figure 11:
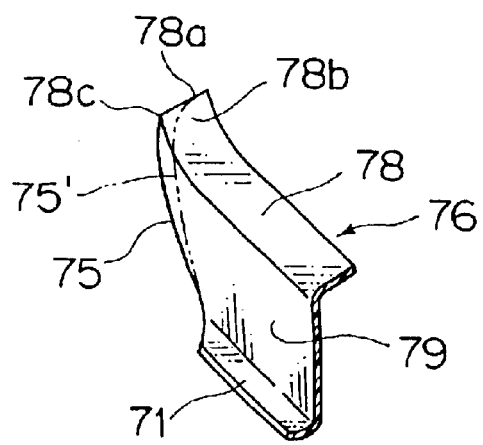
FIG. 11 is an enlarged view at a part B in FIG. 8.
Figure 12:
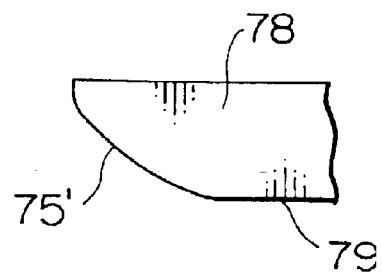
FIG. 12 is a plan view showing another format of the rear-extended portion of the cover shown in FIG. 11.

As indicated by chain line in FIG. 11 and as seen from FIG. 12, the rear slanted sliding-contact portion 75' may be formed in such a manner that the upper wall 78 and the base plate 79 are cut in a curved shape from the inside portion of at the rear end of the upper wall 78 of the rear extending portion 76. This prevents the wire harness 3 from being caught in a corner 78c (FIG. 11) at the rear end outside of the upper wall 18, thus facilitating the smooth movement of the wire harness $3_3$.

Incidentally, the cover 55' and the protector body 54' can be integrally formed of synthetic resin. Incidentally, the peripheral wall 69 of the cover 55' and the peripheral wall (limiting wall 57) of the protector body 54' are integrated to each other. The upper wall 78 of the rear extending portion 76 of the cover 55' and the upper wall of the rear extending portion 62 of the protector body 54' are integrated to each other. The slanted contact portion 72 and slanted sliding-contact portion 73–75 are formed on the stem wall 58' of the protector 50' and the rear extending portion 76. The slanted contact 72 and slanted sliding-contact portions 73–75 may be applied to the protector 9 in the embodiment of FIG. 1.

In each of the embodiments described above, the protectors 9, 50 and 50' may be arranged on the side of the vehicle body.

Embodiment 3

Figure 13:
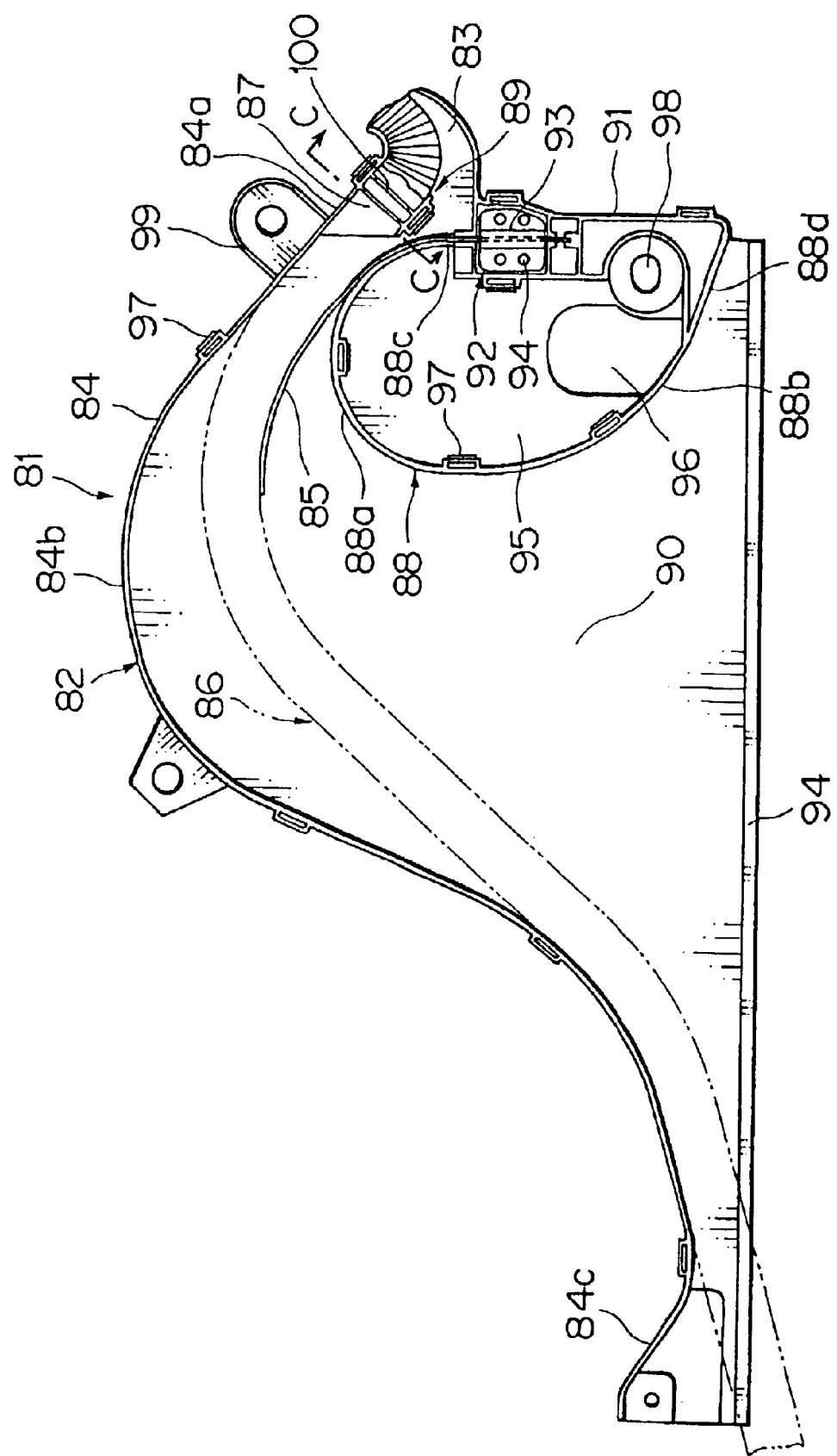
FIG. 13 is a front view showing another format of the protector (exclusive of the cover)

FIG. 13 shows a third embodiment of the power supply apparatus (protector).

The protector 81 includes a protector body 82 of synthetic resin and a cover (not shown). The protector has a first harness outlet 83 at the upper front of the protector body 82. The protector 81 has a loop-shaped bending limiting wall (bending limiting portion) 88 corresponding to an elastic member 85 and a wire harness 86 (inclusive of the corrugated tube 87) inside a regulating wall 84 at the front of the protector body 82. The protector 81 has a harness securing portion 89 for securing a corrugated tube on the outer periphery of the wire harness.

The regulating wall 84 is an outer wall orthogonal to the base plate 90. The regulating wall 84 includes a short slanted linear portion 84a successive to the first harness outlet 83, a arc-curved segment 84b successive to the linear portion 84a and a skirt portion 84c at the rear end. The above harness securing portion 89 is formed integrally to the linear portion 84a.

The bending limiting wall 88 is composed of a semi-circular half 88a which is located behind and adjacently to the harness securing portion 89 and a lower half 88b which is curved in an arc shape extending forward from the rear end of the upper half 88a. The expressions "behind" and "forward" mean those of the vehicle body. The front end of the lower half 88b linearly slants in a downward direction, and crosses the vertical front end wall 91 of the protector body 82. The bending limiting wall 88 extends upright at the same height as those of the outer peripheral wall 84 and the front end wall 91 from the base plate 90.

The front end portion of the upper half 88a which is adjacent to the harness securing portion 89 has a vertical short linear segment 88c. On the lower side of the linear segment 88c, the stem of a metallic flat spring serving as the elastic member 85 is secured to the base plate 90 by means of a metallic securing bracket 92. The elastic member 85 has a recess (not shown) at its stem. A securing portion 93 at the center of the securing piece 92 is fit in the recess, and the hole portions 94 of the securing piece 92 are fixed by a bolt (not shown) or heat-sealing of resin protrusion (not shown) of the base plate 90.

The securing piece 92 is located at the center position of the front end of the protector body 82 in the height direction. The upper half 88a of the bending limiting wall 88 is located at the position corresponding to about half of the entire height of the protector body 82. The harness securing portion 89 is located oppositely to the upper side of the securing piece 92. The upper end of the bending limiting wall 88 is located at a higher position than the harness securing portion 89.

The elastic member 85 is extended along the vertical linear segment 88c of the bending limiting wall 88 and is curved in an arc shape rearward in contact with the lower surface of the wire harness 86. The wire harness 86 is introduced from the first harness outlet 83 into the protector body 82, and arranged in a curved shape along the outer surface of the elastic member 85. The wire harness 86 is derived at the end of the protector body 82 along the skirt portion 84c thereof from the lower second harness outlet 94 to the vehicle side (not shown). In this state, the slide door (not shown) is substantially fully closed. The wire harness 86 can be freely curved along the inner surface of the regulating wall 84 on the way of opening/closing the slide door.

Another functional component (not shown) can be arranged with the internal space 95 surrounded by the bending limiting wall 88. A window 96 is formed in the base plate 90 so as to communicate with the internal space 95. The protector body 82 is provisionally assembled with or secured to the slide door using the window 96. The bending limiting wall 88 has a smooth plane with no protuberance on its outer face and securing frame pieces 97 at several positions on its inner face. Securing pieces of the cover (not shown) are engaged with slits in the frame pieces 97. The bending limiting wall 88 is supported from inside by the securing pieces 97 to increase the bending rigidity of the bending limiting wall 88.

The frame pieces are provided at several positions on the outside of each of the regulating wall (outer wall) 84 and front end wall 91. The protector body 82 is completely secured to the slide door in such a manner that bolts passed through the hole portion 98 inside the bending limiting wall 88 and the hole portion of the bracket 99 which protrudes from the outer wall 84 are tightened into the panel of the slide door.

Figure 14:
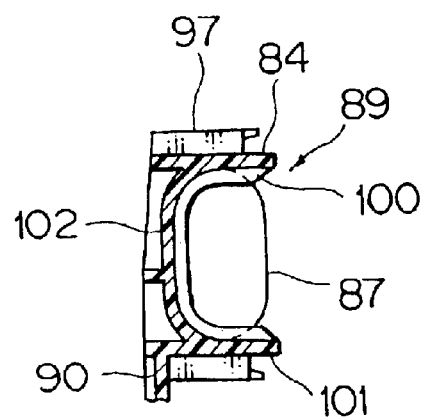
FIG. 14 is a sectional view taken in line C—C in FIG. 13.

As seen from FIG. 14 (sectional view taken in C—C in FIG. 13), the harness securing portion 89 has a rib-like protruding strip 100 which is engaged with a concave groove of the corrugated tube 87, and firmly secures the corrugated tube 87 in the longitudinal direction.

In the embodiment, the corrugated tube 87 has an elliptical cross section. The corrugated tube 87 has circumferential concave grooves and convex strips which are arranged alternately in the longitudinal direction. The protruding strip 100 is engaged with the concave groove, specifically, in the three faces constituting a ⊐-shape consisting of the inner face of the outer wall 84, inner face of the upright wall 101 and bottom wall 102 which smoothly couples the outer wall 84 and the upright wall 101. Two or three protruding strips 100 are arranged in parallel. These protruding strips secure the wire harness 82 to the vicinity of the first harness outlet 83 in the same manner by the two protrusions for fixing the corrugated tube in FIG. 9.

The upright wall 101 is extended vertically from the base plate 90. The bottom wall 102 is located at a higher position than the base plate toward the cover, and communicated with the upright wall 101 and outer wall 84 in a curved shape along the outer shape of the corrugated tube 87. The protruding strip 100 is curved along the outer shape of the corrugated tube 87. Frame portions 97 for securing with the cover are provided on the outer faces of the upright wall 101 and the outer wall 84.

A protruding strip may be provided on the inner face of the cover (not shown) so as to be opposite to the protruding strip 100. Where the corrugated tube having a circular cross section is used, the bottom wall 102 and protruding strip 100 thereon are formed so as to be semi-circular. The number of the protruding strips can be determined optionally. However, in order that the protruding strip can be engaged with the concave groove of the corrugated tube, two or three protruding strips are preferably arranged. Further, the corrugated tube (not shown) may be supported to be rotatable circumferentially so that twisting of the corrugated tube can be prevented.

The structure including the bending limiting wall 88 provides the following effect. In the operation of opening the slide door, when the wire harness 86 is pulled forward together with the elastic member 85 while they are greatly curved downward, they are curved along the bending limiting wall 88. In this case, they are not curved at an angle exceeding the angle defined by the bending limiting wall 88. Thus, the wire harness 86 and the elastic member 85 can be prevented from being bent, plastically deformed or damaged.

The outer diameter and shape of the bending limiting wall 88 are set so that the elastic member 85 is supported within an elastic permissible limit and the wire harness 86 is not bent at an acute angle. The wire harness 86 and the elastic member 85 will be bent with an "R" which is smaller than the bending "R" of the bending limiting wall 88. Thus, since the damage of the elastic member 85 can be prevented, when the slide door is opened/closed, the wire harness 86 can be always absorbed surely within the protector 81 (the wire harness 86 is always urged upward) so that the wire harness 86 can be surely prevented from being caught between the vehicle body and slide door.

Even if the elastic member 85 is damaged owing to fatigue, the wire harness 86 is supported in the shape curved along the bending limiting wall 88 and hence is lifted to a prescribed height or higher. Thus, the wire harness 86 is not excessively pulled out from the second harness outlet 94 on the lower side of the protector 81 so that the wire harness 86 can be prevented from being caught between the vehicle body and slide door.

Since the first harness outlet 83 is arranged on the upper side of the protector 81 or its vicinity, the wire harness 88 which has been introduced from the first harness outlet 83 into the protector will be immediately supported by the bending limiting wall 88. This also prevents the wire harness 86 and elastic member 85 from being unreasonably bent. If the first harness outlet 83 is located at the lower side of the front end of the protector 81, the wire harness 86 is bent greatly (at a large curving angle). The embodiment prevents this so that unreasonable bending stress is not applied.

Further, since the wire harness 86 can be easily fixed by the harness securing portion 89, the operability of arranging/securing the wire harness 86 for the protector 82 can be improved. Further, since the wire harness 86 is firmly secured to the harness securing portion 89, even when the wire harness is pulled forcibly owing to the abrupt opening/closing of the slide door, the wire harness 86 will not be further introduced from the first harness outlet 83 into the protector 81. Thus, an increase in the looseness of the wire harness 86 can be prevented and the looseness of the wire harness 86 can be always absorbed by the elastic member 85 so that the wire harness 86 will not be caught between the vehicle body and the slide door.

In place of the bending limiting wall 88, a plurality of pins or plate-like protrusions (not shown) may be arranged on the base plate 88 in a shape of the bending limiting wall 88 so as to constitute a bending limiting portion. The bending limiting wall 88 is not required to be continuous, but short bending wall segments (not shown) may be arranged to constitute the bending limiting portion. Further, where the protective tube (not shown) with no groove is used in place of the corrugated tube 87, the harness securing portion can be changed into the other medium such as a band or clamp.

The protector 81 shown in FIG. 13 may be provided with the slanted sliding-contact portions 73–75 of the protector 51' shown in FIG. 8. The slanted contact portion 72 in FIG. 8 corresponds to the slanted portion 88d at the lower end of the bending limiting wall 88 in FIG. 13.

Embodiment 3

Figure 15:
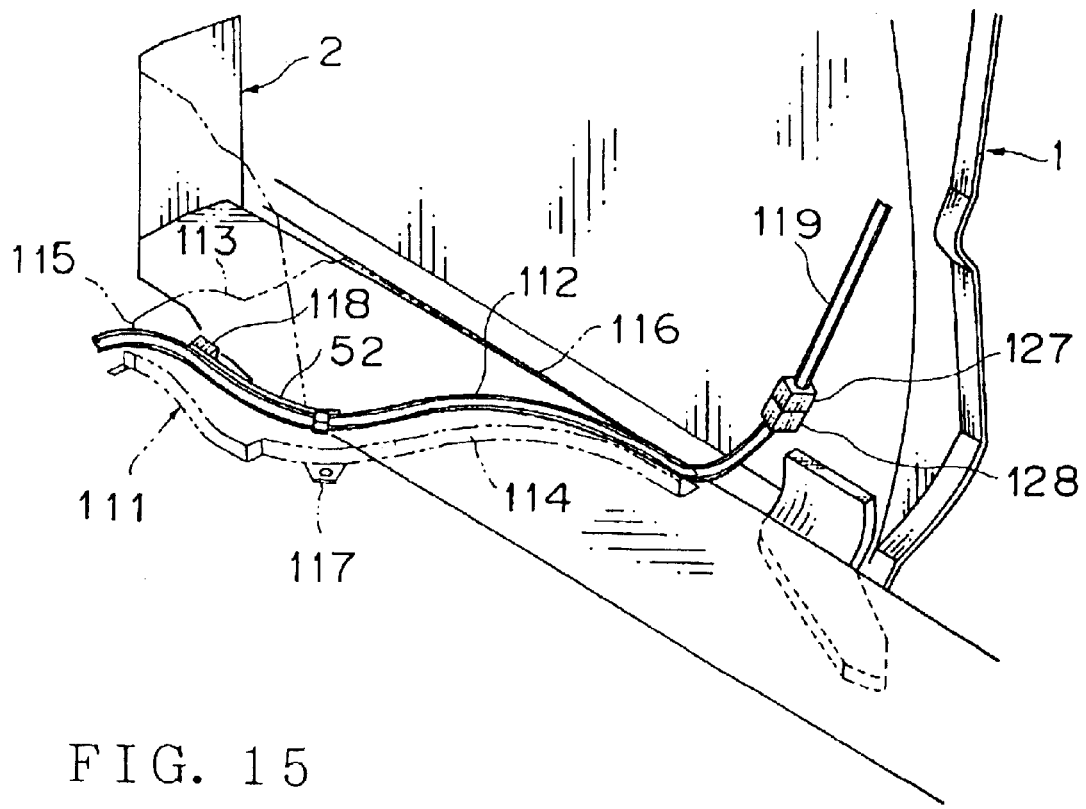
FIG. 15 is an exploded perspective view of a third embodiment (in a closed state of the slide door) of a power supply apparatus for a slide door in a motor vehicle according to this invention.
Figure 16:
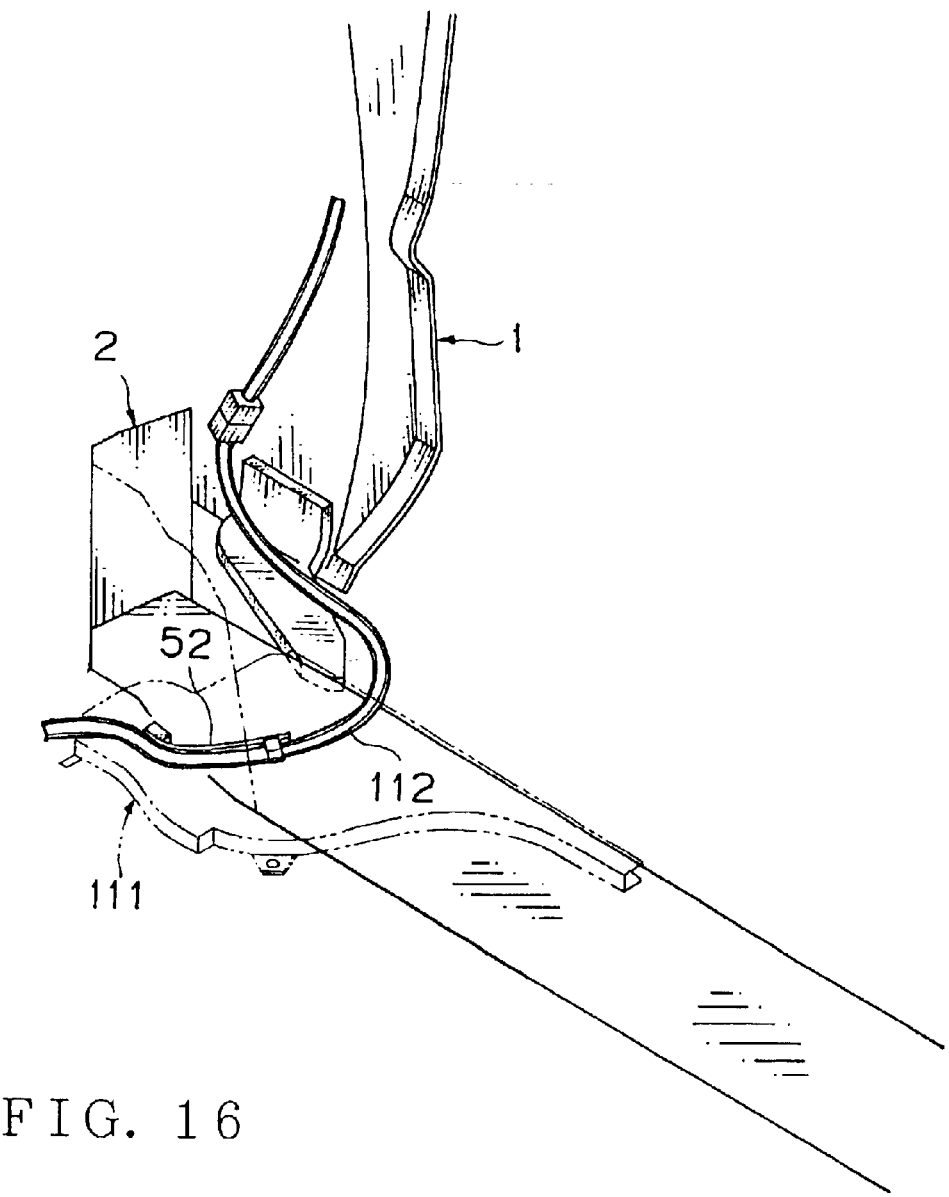
FIG. 16 is a perspective view of the third embodiment in an open state of the slide door.

FIGS. 15 and 16 show a third embodiment of a power supply apparatus for an in-vehicle slide door. In these figures, like references refer to like elements in FIG. 1.

In this power supply apparatus 110, in place of the embodiment shown in FIG. 4, a protector 111 of synthetic resin is arranged not on the side of the slide door 1 but on the side of the vehicle body 2. In this structure, looseness of the wire harness arranged from the slide door 1 into the vehicle body 2 is absorbed by an elastic member 52 within the protector 111 on the side of the vehicle body.

In this embodiment, the protector 111 is arranged horizontally beneath the step portion 16 of the vehicle body. The rear end of the protector 111 extends to the side of the slide door 1 and the front end 114 thereof is gradually width-reduced to form a lateral concave shape in cross-section. The protector 111 has a first harness outlet 115 on its rear inner side and a second harness outlet 116 which is opened wide linearly toward the side of the slide door 1. The protector 111 is secured to the vehicle body 2 by the bracket 117.

The elastic member 54 is extended from the rear end (first harness outlet 115) of the protector 111 to the middle portion thereof in the longitudinal direction. The wire harness 112 is arranged along the elastic member 52. The stem of the elastic member 52 is secured to the protector 111 by a securing piece 118. The elastic member 52 should not be limited to a flat spring, but may be an elastic means (not shown) in various forms. The material, shape and location of the protector may be changed as necessary. The protector 111 preferably includes a protector body and a cover in view of the workability of assembling the wire harness. Incidentally, the protector 111 may be provided with the slanted contact potion 72 and slanted sliding-contact portions 73–75 as shown in FIG. 8.

In the fully closed state of the slide door 1 shown in FIG. 15, the wire harness 112 is pulled forward along the curved segment of the protector 111, and the elastic member 52 urges the wire harness 112 toward the passenger section of the vehicle body 2. The wire harness 112 on the side of the vehicle body 2 which has been derived from the second outlet 116 of the protector 111 is connected to the wire harness 119 on the side of the slide door though connectors 127, 128. The door side wire harness 119 is connected to functional components (not shown) within the slide door 1.

In the fully opened state of the slide door 1 shown in FIG. 16, the wire harness 112 is pulled backward together with the slide door 1 so that it is greatly curved backward to loosen. However, it is also urged toward the passenger section of the vehicle body owing to the restoring force of the elastic member which has been curved together with the wire harness. Thus, the looseness of the wire harness 112 is absorbed so that the wire harness 112 can be prevented from being caught between the slide door 1 and the vehicle body 2.

What is claimed is:

1. A power supply apparatus for a slide door in a motor vehicle, comprising:

a wire harness arranged to extend from a vehicle body side to a slide door and having a curved segment at its middle portion in a longitudinal direction;

a protecting member which includes a first harness outlet for supporting said wire harness and a second harness outlet which permits the wire harness to shuttle to and fro in a door opening/closing direction according as the slide door opens/closes and houses said curved segment so that it is movable in parallel to the slide door, wherein said protecting member comprises:

a first curved wall and a second curved wall which constitute said first harness outlet between their first ends and said second harness outlet between their second ends, and are curved in the same direction to locate said curved segment therebetween;

a guiding portion arranged in said second harness outlet in a state extended in the door opening/closing direction; and a slider which slides along the guide portion while it directly or indirectly holds said wire harness derived from said second harness outlet.

2. A power supply apparatus according to claim 1, wherein said slider includes a first arm for oscillatably holding said wire harness derived from said second harness outlet in the door opening/closing direction.

3. A power supply apparatus according to claim 1, wherein said slider includes a second arm for oscillatably holding said curved segment immediately before derived from said second harness outlet in the door opening/closing direction.

4. A power supply apparatus according to claim 1, wherein said wire harness derived from said second harness outlet having a tube between itself and said slider.

* * * * *